April 20, 1965 G. A. CRAIG 3,179,231
ARTICLE TRANSFER MEANS FOR CONVEYORS
Filed Aug. 1, 1961 2 Sheets-Sheet 1

INVENTOR.
George A. Craig
BY
ATT'YS

INVENTOR.
George A. Craig

United States Patent Office 3,179,231
Patented Apr. 20, 1965

3,179,231
ARTICLE TRANSFER MEANS FOR CONVEYORS
George A. Craig, Louisville, Ky., assignor, by mesne assignments, to Geo. J. Meyer Manufacturing Co., Cudahy, Wis., a corporation of Wisconsin
Filed Aug. 1, 1961, Ser. No. 128,531
8 Claims. (Cl. 198—32)

This invention pertains to conveyor apparatus, and more especially to improved means for transferring a moving article from one path into a path substantially at right angles thereto. While of more general utility, the invention is herein specifically disclosed, by way of example, as embodied in an article feeder for supplying articles, for instance bottles or cans, to a processing machine or apparatus, such for instance as a labeler or capper, the feeder being so devised as to move articles simultaneously along a plurality of parallel supply paths by an intermittently acting conveyor device, and wherein the articles, moving along said parallel paths, are discharged, one at a time, and simultaneously from their respective paths, onto a continuously moving delivery conveyor extending at right angles to said parallel paths, so as to form a single row on said delivery conveyor.

Since, in such apparatus the constantly moving conveyor is expected to carry the articles away as fast as they are delivered to it, its linear velocity must be of the order of $M \times V$ (where V is the linear velocity of movement of articles along said supply paths and M equals the number of said parallel paths), and thus the linear velocity of the constantly moving delivery conveyor, in most instances, is very substantial.

In the operation of such feeder apparatus, it has been found that when the articles from the supply paths are transferred onto the delivery conveyor, they have a tendency to tip, particularly if they are light in weight or tall and narrow, because of their inertia which opposes a sudden change in direction or velocity.

The present invention has for an object the provision of means whereby the tipping of the articles, during transfer, is prevented. A further object is to provide means operative, as an article is delivered from one of said parallel supply paths onto the delivery conveyor, to provide support for the article, such as to prevent it from tipping and concomitantly to apply force to the article at a point desirably spaced substantially above the plane of the delivery conveyor, such as positively to impart motion of the article in the direction of the latter conveyor. A further object is to provide means operative to apply advancing force to an article in the direction of the delivery conveyor and at a point above the plane of the latter, for a sufficient time to insure that the speed of the center of gravity of the article approximates that of the delivery conveyor, and then automatically to terminate the application of such force. A further object is to provide transfer means comprising a part which functions, first, to terminate advance of the article in the direction which it had while moving along the supply path and which, while partially embracing the article, moves concomitantly with the moving delivery conveyor for a limited distance in the direction of movement of the latter conveyor, so as positively to advance the article in that direction, and which is then disengaged from the article so as to permit the latter to continue on along the path defined by the delivery conveyor.

Other and further objects and advantages of the invention will be pointed out in the following more detailed description and by reference to the accompanying drawings wherein.

Figure 1:
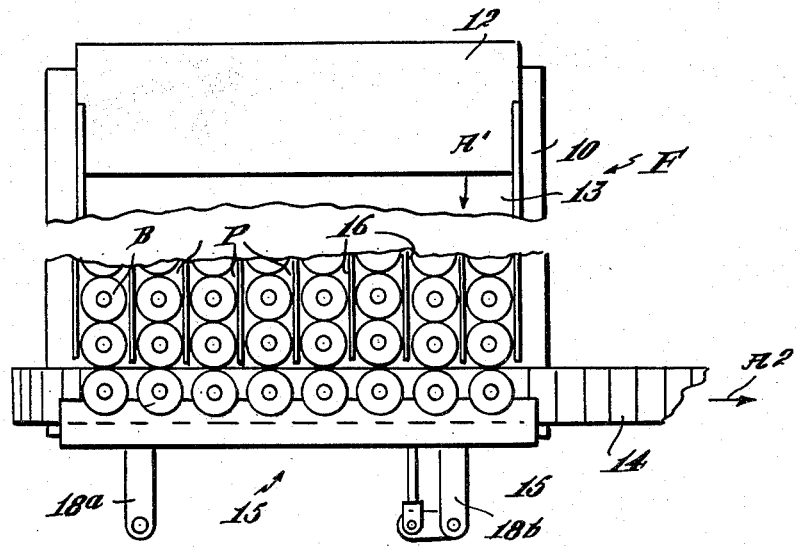
FIG. 1 is a fragmentary plan view of the discharge end of an article feeder of the above type, including a portion of the delivery conveyor and showing the transfer device, of the present invention, embodied therein.

Referring to the drawings, the character F designates, in general, an article feeder of a conventional type comprising a suitable frame 10 which supports a dump board 12 on which articles may be placed in readiness to be advased by the intermittently moving supply conveyor device 13, whose direction of motion is indicated by the arrow $A^1$ (FIG. 1), and whose supporting run is in the same plane as that of the constantly moving delivery conveyor 14, whose direction of movement is indicated by the arrow $A^2$—it being noted that the conveyor 14 moves in a direction at right angles to that of the intermittently moving conveyor device 13. The conveyor device 13 desirably is a single endless chain or belt of a width to receive a plurality of rows of bottles, cans or other articles (indicated by the character B), these articles being advanced by the conveyor device 13 in parallel rows along paths P defined by separator plates 16. As here shown, eight rows of articles B are advanced simultaneously by the intermittently moving conveyor device 13. Obviously, a separate conveyor might be employed for moving articles along each of the paths P, and those portions of the single wide chain or belt which move articles along each of said paths may here be referred to as though they were independent conveyors.

In accordance with the present invention, an elongate bar 15 of a length at least as great as the width of conveyor 13, constitutes a barrier to the advance of articles by the conveyor 13, beyond the point at which the articles are centered on the conveyor 14. In feeders of conventional type, this bar 15 is automatically moved bodily toward and from the longitudinal center line of the conveyor 14 by means which moves it to a position such as that shown in FIG. 1, in properly timed relation to the motion of the supply conveyor 13, so as to stop the foremost bottles, advanced by the conveyor 13, when these bottles are centered on the conveyor 14, whereupon, the bar 15 is moved directly away from the conveyor 14 so as to allow the bottles, which have been placed in a row on the conveyor 14, to be carried away by the latter conveyor—the means for actuating the bar 15 being so devised that, as soon as the last bottle of the row which was placed on the conveyor 14 has passed the end of the bar 15, the latter is moved back to its initial position so as to stop the next row of articles to be delivered by the conveyor 13.

In the conventional arrangement just described, when the bar 15 is retracted from the conveyor to free the bottles standing on the conveyor 14, their sudden release from lateral restraint, while their bottoms are in frictional contact with the conveyor 14, often results in the tipping of the bottles since, because of their inertia, their centers of gravity do not instantly accelerate to the speed of the conveyor 14.

In accordance with the present invention, this difficulty has been overcome by so supporting and actuating the bar 15, that as soon as a row of bottles has been centered on the conveyor 14, the bar begins to move bodily in the direction of the delivery conveyor 14, and since this bar, or, at least one of the elements of this bar engages the bottle at a point substantially above the plane of the conveyor 14 and approximately in the horizontal plane of its center of gravity, the motion of the bar instantly starts the bottle into motion in the direction of the conveyor 14. After the bar 15 has moved in this direction a predetermined distance, it is retracted from the conveyor 14 so as to disengage the articles so that they are free to continue along the conveyor path, but since the articles have already been put into motion in the direction of the conveyor 14 and at a linear speed which may approximate that of the conveyor 14, danger of tipping of the bottles, when released by the bar 15, is substantially avoided. The bar 15 is now returned to its initial position automatically in readiness to act as a stop for centering the next row of bottles to be delivered onto the conveyor 14—the mechanism for actuating the bar 15 being so devised that it performs its cycle of motion during the dwell of the conveyor 13.

Figure 2:
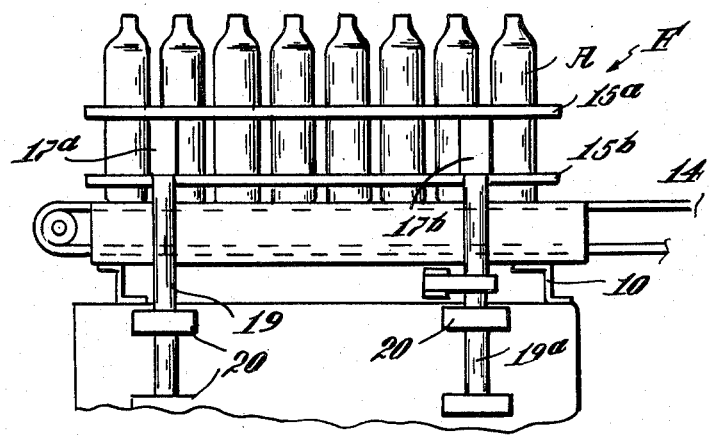
FIG. 2 is a fragmentary front elevation showing the parts illustrated in FIG. 1.
Figure 5:
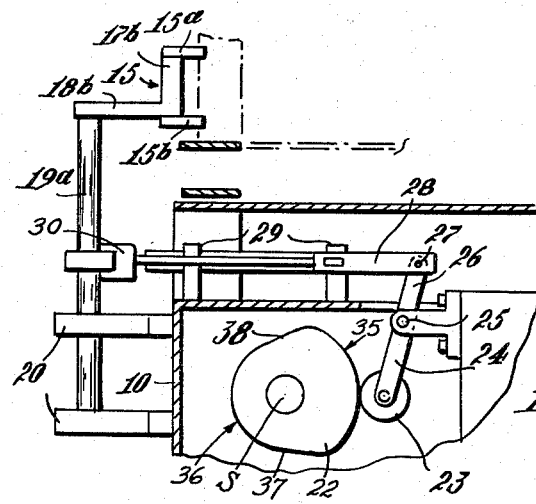
FIG. 5 is a fragmentary elevation, partly in vertical section, of the mechanism illustrated in FIG. 4, viewed from the right of FIG. 4.

As here illustrated, the bar 15 comprises vertically spaced parallel upper and lower elongate rigid plates 15a and 15b, which are united by struts 17a and 17b (FIG. 2) pivotally connected to and spaced apart longitudinally of the plates. These struts have horizontal arms, 18a and 18b, respectively, constituting parallel cranks, which are fixed to the upper ends of rotary vertical shafts 19 and 19a, which are arranged to turn in bearings provided in brackets 20 (FIGS. 2 and 5) fixed to the machine frame. The shaft 19 is free to turn while the shaft 19a is rocked by the mechanism about to be directed. With this arrangement the bar 15 may be moved toward and from the conveyor 14 while remaining always parallel to the direction of motion of the conveyor 14.

Figure 3:
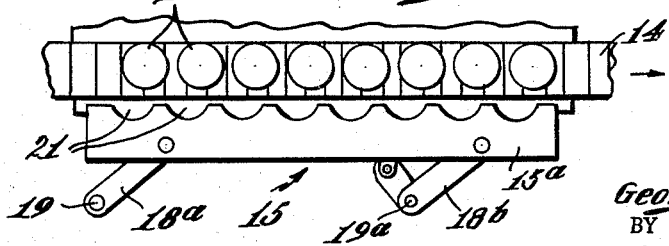
FIG. 3 is a fragmentary plan view showing the transfer device of the present invention in a position different from that illustrated in FIG. 1.

As shown in FIG. 3, that edge of the bar 15, or more accurately speaking, the edges of the upper and lower members 15a and 15b of the bar 15, are provided with arcuate recesses 21 whose edges are designed partially to embrace the bottles with which the bar contacts. These recesses may be of a shape to correspond to the contour of the article B, or of other desired shape, or replaced by functionally equivalent devices. The recesses are so spaced apart and so arranged that when the bar 15 occupies the position shown in FIG. 1, one of these recesses is in registry with each, respectively, of the article paths P, and with the edge of the bar intermediate the recesses at approximately the vertical longitudinal center line of the conveyor 14. On the other hand, when the crank arms 18a and 18b are rocked to the position shown in FIG. 3, the recessed edge of the bar 15 is withdrawn from the conveyor 14 sufficiently to permit free motion of the articles B by the conveyor 14.

Figure 4:
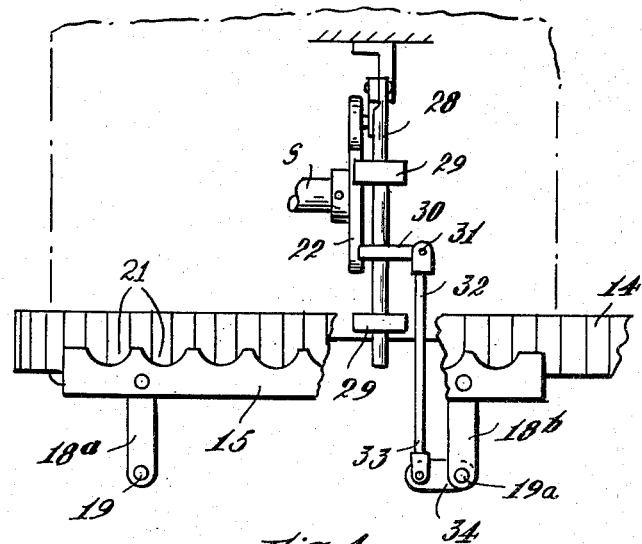
FIG. 4 is a fragmentary plan view showing a portion of the continuously moving delivery conveyor, and portions of the transfer device of the present invention, and showing, in plan, the actuating mechanism of the transfer device.

The intermittently moving conveyor 13 is driven through the intermediary of suitable mechanism (not here shown) from a driven constantly turning main shaft S (FIG. 4). On this shaft there is mounted a cam 22 (FIG. 5), having a suitably contoured peripheral edge which engages a roller 23, pivotally mounted on one end of an arm 24 of a lever fulcrumed at 25 to a bracket carried by the frame of the machine, and whose other arm 26 is pivotally connected, at 27, to one end of a bar 28 (FIG. 4) which is arranged to slide endwise in bearings in brackets 29 carried by the machine frame. A yoke member 30 (FIG. 4) is secured to the bar 28 at a point between the bearings 29 and to this yoke member there is pivotally connected, at 31, one end of a link member 32, whose opposite end is pivotally connected at 33 to a short crank arm 34 fixed to the rock shaft 19a. As here shown (FIG. 5), the peiprhreal edge of the cam 22 is shaped to provide two circular dwell portions 35 and 36, respectively connected by active portions 37 and 38.

The cam is so placed on the shaft S that while a dwell portion 36 is in contact with the roller 23, the bar 15 will be in the posiiton shown in FIG. 1 and the conveyor 13 will be in motion to advance articles from the several paths P onto the conveyor 14. As the conveyor 13 ceases its forward motion, one of the active portions of the cam 22 engages the roller 23, and the bar 28 is thereby so actuated, by means of link 32, as to swing crank arm 34 and thereby move the member 15 longitudinally of and concomitantly away from the conveyor 14. That component of its motion, which is in the direction of arrow $A^2$, gives an impetus to the bottles in that direction such that when the bar, in moving away from the conveyor, releases the bottles, they are moving with a velocity sufficiently near that of the conveyor to insure against tipping. The dwell 35 of the cam now engages the roll 23 and holds the bar 15 in the retracted position shown in FIG. 3, while the row of bottles on the conveyor 14 is carried along and past the end of the bar 15. The other active portion of the cam 22 now, by engagement with the roller 23, restores the bar 15 to the position of FIG. 5, so that now the dwell portion 36 again takes control and holds the bar 15 in the receiving position of FIG. 1 to complete the cycle of operation.

Thus, by this very simple arrangement, the bottles are steadied by engagement with the recesses 15 as they move from the supply conveyor 13 onto the rapidly moving conveyor 14, and are then positively advanced along the conveyor 14 by the action of the bar 15 until they have been accelerated sufficiently to prevent them from tipping when released from the bar 15.

Figure 6:
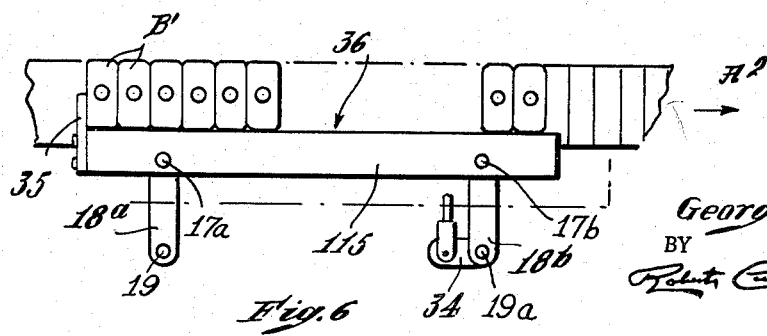
FIG. 6 is a fragmentary plan view showing a portion of a continuously moving conveyor with a row of articles of generally rectangular transverse section standing thereon, and illustrating a transfer device of modified form.

In FIG. 6 there is illustrated a slight modification, wherein the bar 115, corresponding to the bar 15 above described, is supported by the parallel-cranks 18a and 18b, in the same manner as the bar 15, and is actuated in the same manner. However, this bar 115 is provided with recesses 21 in its edge, such as above described, but is rectilinear and is designed, in particular, for cooperation with closely contacting bottles $B^1$ or packages of substantially rectangular transverse section. In this instance, the bar 115 is provided at its left-hand end, as viewed in FIG. 6, with a pusher finger 35 which, in the position of the part shown in FIG. 6, extends approximately half way across the width of the conveyor 14. In this case, the contact of the pusher finger 35 with the last bottle in the row acts to apply pressure, such as to accelerate the articles, in the direction of arrow $A^2$, so as to prevent the articles from tipping in response to the sudden urge of the conveyor 14 on which they stand.

The apparatus of the present invention is especially useful as above suggested, in dealing with articles which are tall and narrow, or those which are of very light weight, for example empty plastic containers which tip very easily.

While certain desirable embodiments of the invention have been herein suggested by way of example, it is to be understood that the invention is broadly inclusive of any and all modifications falling within the scope of the appended claims.

I claim:

1. Transfer means for use in conveyor apparatus of that kind wherein an intermittently moving supply conveyor advances articles in side-by-side, solid columns along a predetermined supply path and simultaneously delivers the foremost article of each of the several columns onto a constantly moving delivery conveyor extending at right angles to the supply path, an elongate article-controlling bar, parallel to the delivery conveyor, that edge of said bar which is opposed to the oncoming articles on the supply conveyor having therein spaced recesses, each normally registering with one, respectively, of said columns of articles, and each of a shape and size such as to embrace, at least partially, one of said articles, means supporting said bar for bodily motion in the direction of the supply conveyor and also in the direction of the delivery conveyor, and means for so actuating said bar as, at times, to cause it to dwell in position to receive in each of its recesses an article from the supply conveyor and, at other times, to move the bar away from the supply conveyor while concomitantly moving it in the direction of the supply conveyor.

2. Transfer means for use in conveyor apparatus wherein articles are advanced in a solid column along a predetermined supply path by an intermittently moving supply conveyor and are discharged by said supply conveyor, one-by-one, onto a constantly moving delivery conveyor extending at right angles to said supply path, article-controlling means wholly independent of the supply conveyor, whereby the foremost article of the column is brought to rest and dwells when it is properly located on the delivery conveyor, said article-controlling means comprising an elongate article-impelling member supported by parallel links to move in a path such that, at times, it moves parallel to the delivery conveyor and also toward and from the delivery conveyor, and actuating means operative, at times, to dispose said member in position to contact an article resting at the dwell position, said impelling member being of a shape such as, by contact with the article, to impart to the latter motion in the direction of the conveyor while the impelling member is moving in that direction.

3. Transfer means according to claim 2 wherein said article impelling member has an article-engaging surface such as partially to embrace an article which it contacts, whereby, when said surface is in contact with an article and the impelling member is moved parallel to the conveyor, motion in that direction is imparted to the article, and actuating means operative, at times, to dispose said impelling member so that its aforesaid surface is contacted by an article resting at said dwell position and, at other times, said impelling member is moved longitudinally of the conveyor.

4. Apparatus according to claim 1, wherein an intermittently acting conveyor advances articles along the supply path, step-by-step, a main shaft for driving said intermittently moving supply conveyor, and means including a cam, driven by said main shaft, means for so moving the impelling device as to place the latter in position to bring the article to rest when the article is properly located on the constantly moving conveyor, and for moving the impelling member in the direction of motion of the constantly moving conveyor.

5. Transfer means for use in conveyor apparatus of that kind which comprises an intermittently moving supply conveyor and a continuously moving delivery conveyor and wherein the supply conveyor advances articles in a solid column along a normally unobstructed predetermined supply path and discharges them, one-by-one, onto the constantly moving delivery conveyor, the latter extending at right angles to said supply path, and article-control means other than the supply conveyor itself for bringing the foremost article of the column temporarily to rest when said foremost article is properly centered on the delivery conveyor, said article-control means being operative, by engagement with the article at a point above the plane of the delivery conveyor, to prevent said foremost article from tipping in response to the action of the delivery conveyor, further characterized in having means defining a plurality of parallel supply paths and intermittently acting conveyor means for advancing articles along each of said paths, the constantly moving delivery conveyor being at right angles to said supply paths, and arranged to receive articles from each of said paths, the article-control means comprising an elongate stop bar, extending parallel to the delivery conveyor, a plurality of parallel crank arms so supporting said stop bar that it may move bodily toward and from the delivery conveyor and also move parallel to the delivery conveyor, said stop bar having article-receiving recesses corresponding in numbr to the several parallel supply paths, a driven shaft for actuating the intermittently acting conveyor means, and means including a cam, driven by said shaft, for so swinging at least one of said crank arms as, at times, to place the stop bar in position such that its several recesses register with the respective parallel paths, so that articles, delivered by the intermittently moving conveyor, are deposited one in each recess, the crank arm actuating means being so devised that, when articles have been received in the recesses, the stop bar is moved longitudinally of the conveyor, thereby to accelerate the articles in the direction of the constantly moving delivery conveyor, the actuating means for the crank arms being operative, when the inertia of the articles has been overcome, to retract the stop bar from the conveyor path and to return it to its initial position in time to receive a new charge of articles from the intermittently moving conveyors.

6. Transfer means for use in conveyor apparatus of that kind which comprises an intermittently moving supply conveyor and a continuously moving delivery conveyor and wherein the supply conveyor advances articles in a solid column along a normally unobstructed predetermined supply path and discharges them, one-by-one, onto the constantly moving delivery conveyor, the latter extending at right angles to said supply path, and article-control means other than the supply conveyor itself for bringing the foremost article of the column temporarily to rest when said foremost article is properly centered on the delivery conveyor, said article-control means being operative by engagement with the article at a point above the plane of the delivery conveyor, to prevent said foremost article from tipping in response to the action of the delivery conveyor, and wherein the means for controlling the foremost article of the column thereby to center it relatively to the delivery conveyor comprises a stop member, means for supporting the stop member so that it may move bodily toward and from the delivery conveyor and also parallel to the delivery conveyor, and means so moving said stop member that, at times, it dwells in position to bring the foremost article of the column temporarily to rest and properly centered on the conveyor and at other times moves in a direction parallel to the delivery conveyor thereby, by contact with said foremost article, to accelerate the latter in the direction of the delivery conveyor.

7. Transfer means for use in conveyor apparatus of that kind wherein an intermittently moving supply conveyor advances articles in a solid column along a predetermined supply path and discharges them, one-by-one, onto a constantly moving delivery conveyor extending at right angles to said supply path, and a movable article-controlling element, other than the supply conveyor itself, which, in one position, terminates the motion of the foremost article of said column in the direction of its advance along the supply path when said article is properly centered upon the delivery conveyor, said control element being so located as to contact said foremost article of the column at a point approximately in the horizontal plane of the center of gravity of the article, and means operative to move said control element, while in contact with the article, in the direction of the delivery conveyor thereby to give impetus to the article in the direction of the delivery conveyor and thereafter to move said control element oppositely to the direction of motion of the delivery conveyor thereby to return it to its initial position.

8. Transfer means for use in conveyor apparatus wherein bottles are advanced along a normally unobstructed predetermined supply path by a supply conveyor and discharged one-by-one onto a constantly moving delivery conveyor extending at right angles to said supply path, means operative temporarily to bring the foremost bottle to rest when it is properly located on the delivery conveyor, said motion-terminating means comprising a part, other than the supply conveyor itself, so shaped and located as partially to embrace the bottle as the latter is advanced onto the delivery conveyor, and actuating means for accelerating said bottle-embracing element while in contact with the bottle in the direction of motion of the delivery conveyor and thereafter to withdraw said article-embracing element from the path of bottles carried by the delivery conveyor when the bottle has attained a predetermined speed.

References Cited by the Examiner
UNITED STATES PATENTS

| | | | |
|---|---|---|---|
| 724,240 | 3/03 | Baker | 198—32 X |
| 1,898,393 | 2/33 | Rickers | 198—32 X |
| 2,587,959 | 3/52 | Biner | 198—32 |
| 2,616,550 | 11/52 | Rowe | 198—20 |
| 2,744,610 | 5/56 | Stiles | 198—32 |

SAMUEL F. COLEMAN, *Acting Primary Examiner.*
EDWARD A. SROKA, ERNEST A. FALLER, Jr.,
*Examiners.*